(12) United States Patent
Afzal et al.

(10) Patent No.: US 9,522,837 B2
(45) Date of Patent: Dec. 20, 2016

(54) METHOD OF MAKING GLASS ARTICLES

(71) Applicant: CORNING INCORPORATED, Corning, NY (US)

(72) Inventors: Bushra Afzal, Painted Post, NY (US); Keith Raymond Gaylo, Painted Post, NY (US); Elias Panides, Whitestone, NY (US); Kevin Lee Wasson, Elmira, NY (US)

(73) Assignee: Corning Incorporated, Corning, NY (US)

( * ) Notice: Subject to any disclaimer, the term of this patent is extended or adjusted under 35 U.S.C. 154(b) by 175 days.

(21) Appl. No.: 14/447,017

(22) Filed: Jul. 30, 2014

(65) Prior Publication Data

US 2015/0040612 A1     Feb. 12, 2015

Related U.S. Application Data

(60) Provisional application No. 61/863,488, filed on Aug. 8, 2013.

(51) Int. Cl.
    *C03B 23/02*          (2006.01)
    *C03B 23/025*        (2006.01)
    *C03B 23/035*        (2006.01)

(52) U.S. Cl.
CPC ....... *C03B 23/0258* (2013.01); *C03B 23/0357* (2013.01)

(58) Field of Classification Search
None
See application file for complete search history.

(56) References Cited

U.S. PATENT DOCUMENTS

| | | | |
|---|---|---|---|
| 7,780,884 B2 | 8/2010 | Niewels | 264/40.6 |
| 8,701,443 B2 | 4/2014 | Bailey et al. | |

(Continued)

FOREIGN PATENT DOCUMENTS

| | | | | |
|---|---|---|---|---|
| EP | 924963 A1 | 6/1999 | | H05B 3/50 |
| JP | 63220948 A | * | 9/1988 | |

(Continued)

OTHER PUBLICATIONS

Patent Cooperation Treaty International Notification of Transmittal of the International Search Report and the Written Opinion of the International Searching Authority, international application No. PCT/US2014/048993: mailing date Oct. 16, 2014, 11 pages.*

(Continued)

*Primary Examiner* — Lisa Herring
(74) *Attorney, Agent, or Firm* — John T. Haran (57) ABSTRACT

A method of making a shaped glass article includes placing a glass sheet on top of a mold. A heat exchanger is arranged relative to the mold such that a heat exchange surface of the heat exchanger is in opposing relation to a back surface of the mold and separated from the back surface of the mold by a gap containing a layer of gas. The height of the gap is selected such that the dominant heat transfer between the heat exchange surface and the back surface of the mold is by conduction through the layer of gas. The glass sheet is heated and formed into a shaped glass article with the mold. The heat exchanger is operated to remove heat from at least part of the mold during at least one of heating the glass sheet, forming the shaped glass article, and cooling the shaped glass article.

12 Claims, 4 Drawing Sheets

(56) References Cited

U.S. PATENT DOCUMENTS

| | | | |
|---|---|---|---|
| 8,783,066 B2 | 7/2014 | Bailey et al. | |
| 2010/0128436 A1* | 5/2010 | Edmunds | H01L 23/427 |
| | | | 361/700 |
| 2012/0297828 A1* | 11/2012 | Bailey | C03B 23/0235 |
| | | | 65/29.18 |
| 2013/0098110 A1 | 4/2013 | Bailey et al. | 65/29.18 |

FOREIGN PATENT DOCUMENTS

| | | | | |
|---|---|---|---|---|
| JP | 11080841 A * | 3/1999 | | |
| JP | 2006130552 A | 5/2006 | | B22D 11/04 |
| JP | 2010227994 A | 10/2010 | | B22D 11/04 |
| KR | 1206574 B1 | 11/2012 | | B29C 35/16 |
| WO | 2014093187 A1 | 6/2014 | | C03B 23/025 |

OTHER PUBLICATIONS

CLEAR, "Cavities and Air Spaces", Comfortable Low Energy Architecture (CLEAR), web address http://www.new-learn.info/packages/clear/thermalbuildings/building_fabric/elements/cavities_and_spaces.html, available per Wayback Machine Archive Sep. 23, 2012.*

Park, Thomas, Samarasekera. "Analysis of thermomechanical behavior in billet casting with different mould corner radii." Ironmaking and Steelmaking, pp. 1-17, 2002, vol. 29, No. 5.

Leung; "Thermomechanical Analyses of Metal Solidification Processes"; MIT Masters Thesis, Feb. 1995.

* cited by examiner

METHOD OF MAKING GLASS ARTICLES

CROSS-REFERENCE TO RELATED APPLICATIONS

This application claims the benefit of priority under 35 U.S.C. §119 of U.S. Provisional Application Ser. No. 61/863,488 filed on Aug. 8, 2013 the content of which is relied upon and incorporated herein by reference in its entirety.

BACKGROUND OF THE INVENTION

1. Field of the Invention

The present disclosure relates generally to glass sheet reforming. More particularly, the present disclosure relates to a mechanism for removing heat from a mold during use of the mold to form a shaped glass article.

2. Description of the Related Art

Glass sheet reforming process involves placing a glass sheet on a mold, heating the glass sheet and mold to their respective forming temperatures, and forming the glass sheet into a shaped glass article. The mold is typically made of metal and often has to run at a surface temperature exceeding 500° C. in order to shape the hot glass without introducing surface damage to the glass or overly cooling the glass before the forming of the shaped glass article is complete. During the forming of the shaped glass article, the mold may need to be cycled up and down in temperature by more than 100° C. in a controlled fashion in a short period of time, requiring closely controlled cooling of the mold in order to produce uniformly shaped glass articles. In other cases, the ideal mold temperature in one location on the shaping surface of the mold is higher, e.g., 50° C. or more higher, than in another surface location on the same mold, requiring high and precisely controlled cooling on only part of the mold.

SUMMARY OF THE INVENTION

The final shape of a shaped glass article formed by a mold is typically required to be very precise, commonly within less than ±100 μm of an ideal shape. The glass will warp by this amount or more due to thermal stresses if the mold surface temperature is not controlled precisely.

Auxiliary processes, such as application of vacuum to conform the glass sheet to the shaping surface of the mold, may prevent the backside of the mold from being sealed for direct gas or liquid cooling, which in turn may require a sealed heat removal device that communicates with the mold through conduction or radiation. At the operating temperatures required for forming glass, radiative heat transfer between the heat removal device and mold is consistent and controllable, but the heat removal rate is relatively low and isolation of a small portion of the mold for heat removal is difficult. Direct solid-to-solid conduction heat transfer between the heat removal device and mold may be used, but the contact resistance is variable and affected by many factors such as surface flatness, surface finish, machining tolerances, and the like, resulting in undesired uneven and variable cooling of the mold. At lower temperatures, any gaps in the contact interface between the mold and heat removal device may be filled with a high conductivity paste to compensate for such irregularities, but this is typically not an option at high temperatures typical of glass sheet reforming processes or when contamination of the glass surface is a concern.

A laboratory-scale process operating with a single mold has demonstrated solid-to-solid contact cooling between a heat removal device and mold at a rate sufficient to increase mold surface temperature gradients by 30° C. or more compared to a no-cooling condition. Very precise machining of components was required, and setups were not repeatable between different equipment assemblies. A radiative cooling plate has been used successfully in a multi-mold production-scale process with repeatable thermal results, but large surface temperature gradients were not attainable because the amount of heat removed was small and not closely focused.

In one illustrative embodiment of the present invention, a heat exchanger is arranged relative to a mold such that a heat exchange surface of the heat exchanger is in opposing relation to a back surface of the mold and separated from the back surface of the mold by a gap containing a layer of gas. The gap has a height greater than zero and defines the thickness of the layer of gas. The height of the gap is selected such that the dominant heat transfer mechanism between the heat exchange surface and the back surface of the mold is by conduction through the layer of gas. The heat exchanger is operated to selectively remove heat from at least part of the mold during the process of reforming the glass sheet with the mold.

The summary above is intended to provide an introduction to the present invention. It is not intended to identify key or critical elements of the invention or to delineate the scope of the invention. Various aspects and embodiments of the invention will be described in greater detail below with reference to the accompanying drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

In the following detailed description, numerous specific details may be set forth in order to provide a thorough understanding of embodiments of the present disclosure. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

Figure 1:
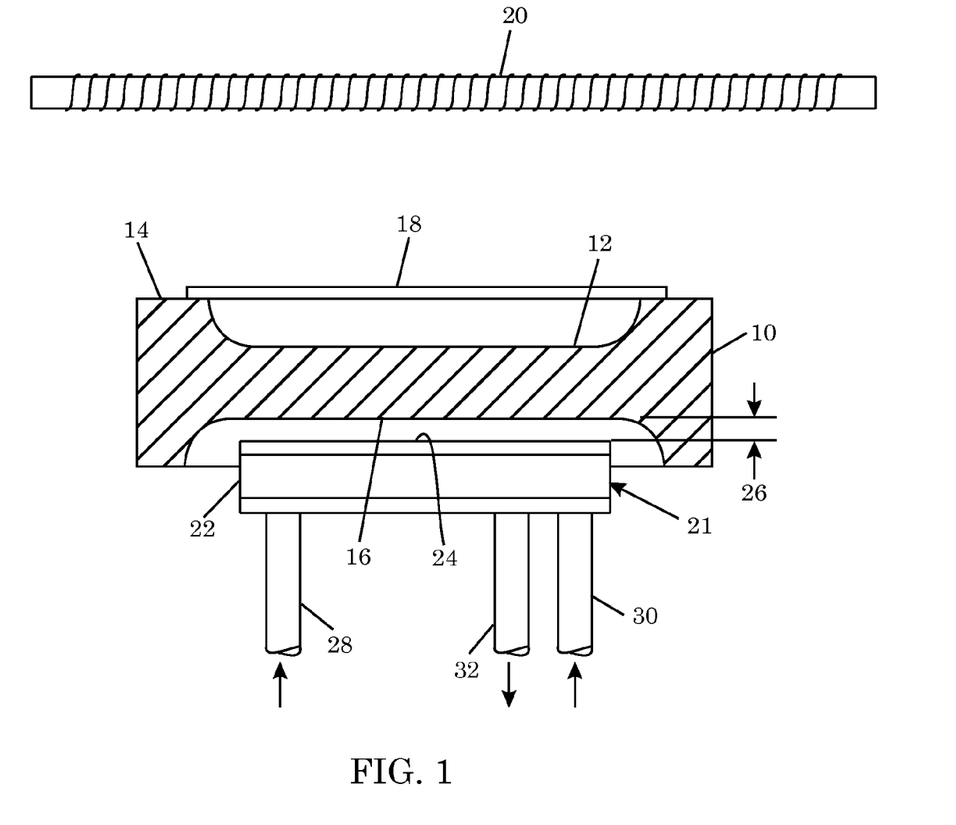
FIG. 1 shows a heat exchanger arranged to remove heat from at least part of a mold during a glass sheet reforming process.

FIG. 1 shows a mold 10 having a shaping surface 12 for forming a shaped glass article. A glass sheet 18 to be formed into a shaped glass article is placed on a top surface 14 of the mold 10. Means such as alignment pins (not shown) may be used to align the glass sheet 18 on the top surface 14 of the mold 10. Above the glass sheet 18 and mold 10 is a heating device 20 comprising one or more heaters for heating the glass sheet 18 and mold 10 to desired forming temperatures. In some embodiments, the heating device 20 comprises one or more radiant heaters, such as infrared heaters, resistive heaters, and the like. Typically, the heating device 20, mold 10, and glass sheet 18 will be arranged in a furnace (not shown) so that the heating of the glass sheet 18 and mold 10 can be controlled. Additional mechanisms may be used to control heating of the glass sheet 18 and mold 10, as described, for example, in U.S. Patent Application Publication No. 2013/00981110 ("Bailey").

A heat exchanger 21 including a heat transfer device 22 is arranged below the mold 10 and operable to remove heat from the mold 10. The arrangement of the heat transfer device 22 is such that an upper surface (or heat exchange surface) 24 of the heat transfer device 22 is in opposing relation to a back surface 16 of the mold 10. The upper surface 24 may correspond to the entire or just a portion of the back surface 16 of the mold 10, depending on where heat removal from the mold 10 is desired. The upper surface 24 of the heat transfer device 22 is separated from the back surface 16 of the mold by a gap 26 containing a layer of gas. The gas may be air or an inert gas or a mixture of gases selected from air and inert gases. The height of the gap 26, measured in a direction normal to the opposed surfaces 16, 24, defines the thickness of the layer of gas. The height of the gap 26 is greater than zero. The height of the gap 26 between the opposed surfaces 16, 24 may be achieved by various means. For example, the mold 10 and heat transfer device 22 can be supported at desired heights relative to some reference plane such that the gap 26 between them has the desired height. Spacers (not shown) with the desired gap height could also be arranged between the opposed surfaces 16, 24. Also, an actuator (not shown) may be coupled to either or each of the mold 10 and heat transfer device 22 to adjust the gap 26 to the desired height.

In general, at a large gap height of 3 mm or more, the dominant heat transfer mechanism between a heat exchanger and mold will be by radiation. In this case, the back surface of the mold will enjoy a high view factor to the heat exchanger, which would yield a substantially uniform cooling over the entire lower surface of the mold. At a large gap thickness of 3 mm, the heat removal from the mold at typical operating temperatures is typically up to 4.5-5.3 W/cm². This heat removal rate is adequate for some mold designs, especially when the glass sheet reforming process requires substantially uniform temperature on the shaping surface of the mold in contact with the glass. However, difficulty is encountered when a higher cooling rate, e.g., 7 W/cm² and greater, is desired over only a portion of the mold, such as a center portion of the mold. The low maximum heat removal rate and relatively high view factor to the back surface of the mold associated with predominantly radiative cooling will make it difficult to establish such directed cooling of the mold.

Figure 2:
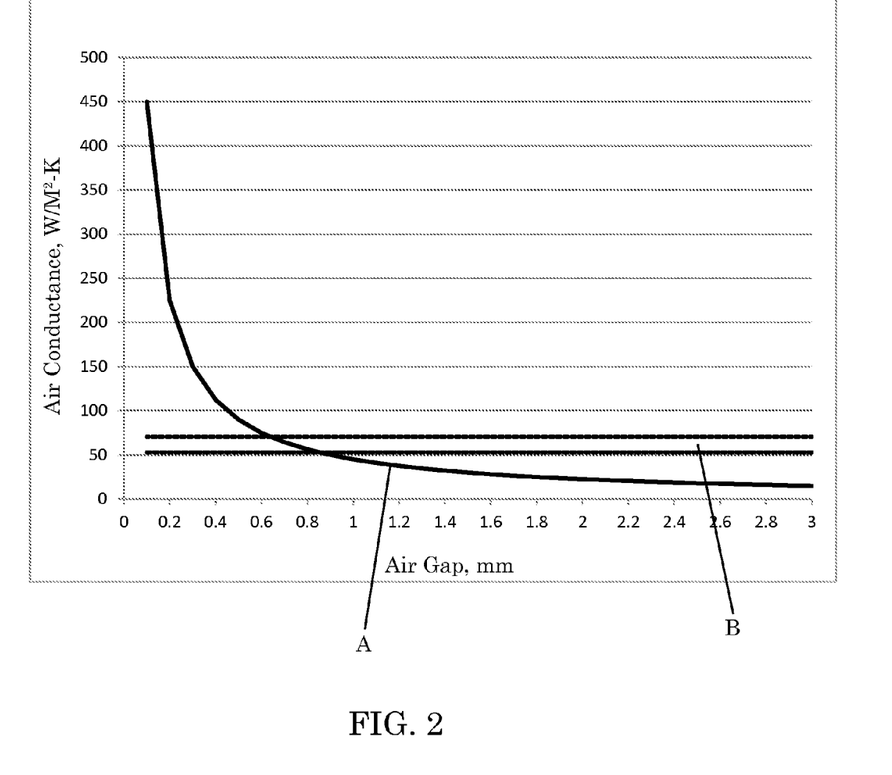
FIG. 2 shows a relationship between air conductance and air gap height.

For example, consider air as the gas in the gap between the mold and heat exchange surface. At typical operating temperatures, the air temperature between the heat exchanger and the back surface of the mold is estimated to be approximately 300° C., which corresponds to an air conductivity of 0.045 Wm$^{-1}$K$^{-1}$. (This air temperature estimate is provided for illustration and is not intended to be limiting. The air temperature could be higher or lower than 300° C. depending on the specifics of the glass reforming process.) Table 1 below shows the conductance of air for various air gap heights. The data shown in Table 1 is also shown in FIG. 2 as curve A.

TABLE 1

| Air Gap, mm | Conductance, W/M²-K | Air Gap Height, mm | Conductance, W/M²-K |
| --- | --- | --- | --- |
| 0.1 | 450.00 | 1.6 | 28.13 |
| 0.2 | 225.00 | 1.7 | 26.47 |
| 0.3 | 150.00 | 1.8 | 25.00 |
| 0.4 | 112.50 | 1.9 | 23.68 |
| 0.5 | 90.00 | 2 | 22.50 |
| 0.6 | 75.00 | 2.1 | 21.43 |
| 0.7 | 64.29 | 2.2 | 20.45 |
| 0.8 | 56.25 | 2.3 | 19.57 |
| 0.9 | 50.00 | 2.4 | 18.75 |
| 1 | 45.00 | 2.5 | 18.00 |
| 1.1 | 40.91 | 2.6 | 17.31 |
| 1.2 | 37.50 | 2.7 | 16.67 |
| 1.3 | 34.62 | 2.8 | 16.07 |
| 1.4 | 32.14 | 2.9 | 15.52 |
| 1.5 | 30.00 | 3 | 15.00 |

From Table 1 and FIG. 2, the effectiveness of conduction heat transfer through the air in the air gap increases dramatically as the thickness of the air gap is reduced below 1 mm. An equivalent conductance for the radiative portion of the heat transfer can also be calculated by the following equation:

$$\kappa = \frac{\varepsilon(T_1^4 - T_2^4)\sigma}{(T_1 - T_2)} \quad (1)$$

where κ is conductance, E is emissivity of surfaces, σ a is Stefan-Boltzmann Constant (5.67×10$^{-8}$ Wm$^{-2}$K$^{-4}$), $T_1$ is the temperature at the back surface of the mold, and $T_2$ is the temperature of the surface of the heat exchanger facing the back surface of the mold. Based on typical operating temperatures, it can be assumed that a reasonable range of heat exchanger temperatures, e.g., 120° C. to 300° C., yields an effective radiative conductance of 55-75 Wm$^{-2}$K$^{-1}$. This range is indicated by the band B in FIG. 2.

From FIG. 2, when the thickness of the air gap between the opposed surfaces of the heat exchanger and mold is reduced substantially, e.g., to 0.8 mm or less, free convection of the air in the air gap ceases to be a factor and conduction through the air in the air gap becomes the dominant mechanism for heat transfer between the cooling device and the mold. As the thickness of the air gap is further reduced, the portion of heat removed through the air in the air gap continues to rise and reaches a practical limit around 0.1 mm. If the thickness of the air gap is reduced much further below 0.1 mm, machining tolerances and variations in the air gap due to thermal expansion will begin to play a significant role in determining local heat removal from the mold. It is expected that inert gas in the gap between the heat exchanger and mold will behave similarly to air in the gap.

In one aspect, the height of the gap 26 (in FIG. 1) is selected such that the dominant heat transfer mechanism between the heat transfer device 22 and the mold 10 is by conduction through the layer of gas in the gap 26. Preferably, the height of the gap 26 is selected such that free convective heat transfer through the layer of gas in the gap 26 is precluded. Preferably, heat transfer through the layer of gas in the gap 26 also does not involve forced convective heat transfer. There will be radiation between the opposed surfaces 16, 24 defining the gap 26. However, in this aspect, the heat removal from the mold 10 due to radiation will be much less than the heat removal due to conduction through the layer of gas in the gap 26. In one or more embodiments, the height of the gap 26 that allows a predominantly conductive heat transfer mechanism between the heat transfer device 22 and mold 10 is less than 3 mm, preferably less than 1 mm. In some illustrative embodiments, the height is in a range from 0.1 mm to 0.8 mm. In other illustrative embodiments, the height is in a range from 0.1 mm to 0.6 mm. The gap height may or may not be uniform across the gap. However, any variances in gap height should be within the acceptable ranges stated above.

With a small gap height, e.g., in a range from 0.1 mm to 0.8 mm, the conductance of the layer of gas in the gap 26 is sufficiently high to significantly increase the heat removal capability of the heat transfer device 22 over radiative heat transfer alone. The small gap height allows a uniform high conductance region to be created between the opposing surfaces 16, 24 of the mold 10 and heat transfer device 22. This high conductance region can facilitate large removal of heat from the mold 10. In some embodiments, the heat transfer device 22 at the small gap height noted above can remove heat at a cooling rate of 7 W/cm$^2$ or more from the mold 10. In addition, the small gap height creates a sharp boundary between high heat removal areas inside the region with the small gap height and low heat removal areas outside the region with the small gap height. Also, the minimum gap height avoids any locally high heat removal sites due to small machining variations or imperfect component alignment and permits relaxed machining tolerances and lower equipment cost.

A shaped glass article can be formed by heating the glass sheet 18 on the mold 10 to a forming temperature, which is a temperature at which the glass sheet can be deformed without damage. In some embodiments, the forming temperature is between an annealing point (temperature corresponding to a glass viscosity of $10^{13}$ Poise) and a softening point (temperature corresponding to a glass viscosity of $10^{7.6}$ Poise) of the glass. In other embodiments, the forming temperature is between a temperature corresponding to a glass viscosity of $10^{11}$ Poise and a temperature corresponding to a glass viscosity of $10^7$ Poise. In some embodiments, the forming temperature is between a temperature corresponding to a glass viscosity of $10^{9.1}$ Poise and a temperature corresponding to a glass viscosity of $10^7$ Poise. In yet other embodiments, the forming temperature is between a temperature corresponding to a glass viscosity of $10^{8.9}$ Poise and a temperature corresponding to a glass viscosity of $10^8$ Poise. The exact temperatures corresponding to the various viscosities will depend on the composition of the glass. For some ion-exchangeable glass compositions, for example, the forming temperature may be in a range from 700° C. to 1100° C. Typically, the forming temperature will also have to be balanced against the operating temperature range of the mold.

Forming of the glass sheet 18 into a shaped glass article starts when the glass sheet 18 reaches the forming temperature. The forming process involves conforming the glass sheet 18 to the shaping surface 12 of the mold 10. The conforming may involve applying force to the glass sheet 18 either by vacuum or by means of a shaping mold or plunger. In one embodiment, the force applied during the conforming is in the form of vacuum that is applied in between the mold shaping surface 12 and the glass sheet 18 to draw the glass sheet 18 against the shaping surface 12. Typically, a second force is then used to hold the shaped glass article against the shaping surface 12 while bringing the shaped glass article to a second temperature that is lower than the forming temperature in a controlled manner. This second force may also be in the form of vacuum that is applied to the contact interface between the mold shaping surface 12 and the shaped glass article. Afterwards, the second force is released, and the shaped glass article is cooled to a temperature below a strain point of the glass.

After forming of the shaped glass article and cooling as described above, the shaped glass article is released from the mold. Gas can be supplied to the same interface between the shaping surface 12 and shaped glass article to assist in releasing the shaped glass article from the mold 10. The heat transfer device 22 will allow access to the backside of the mold 10 such that vacuum and gas can be supplied to the interface between the shaping surface of the mold 10 and glass as needed for the forming and release of the shaped glass article.

During forming of the shaped glass article, heat may be strategically removed from the mold 10 using the heat transfer device 22. The amount of heat to remove from the mold 10, when to remove the heat, and where from the mold 10 to remove the heat will depend on the reforming process and the shape of the article to be formed. For example, if the shape has tight corners near the edges, it may be desirable to keep the glass hotter at the edges than at the center during forming of the glass. In such a case, the heat transfer device 22 may be used to remove heat from the mold 10 in the region of the mold corresponding to the center of the glass. In another example, after the glass has been conformed to the mold 10 and while holding the shaped glass article against the mold shaping surface 12, it may be desirable to control temperature gradients in the glass so that the shaped glass article does not warp. Since the temperature gradients in the glass are affected by the temperature at the mold shaping surface 12 in contact with the glass, the heat transfer device 22 can be used to strategically remove heat from the mold 10. In general, the heat transfer device 22 may be controlled to remove heat from the mold 10 using historical or real-time process data, which may be influenced by deviation of the shaped glass article from an ideal shape.

The heat transfer device 22 (in FIG. 1) may be any suitable heat transfer device. In some embodiments, the heat transfer device 22 is in the form of a cooling plate with internal passages (not shown) through which fluid (or coolant) can be circulated for the purpose of removing heat directed at the upper surface 24 of the heat transfer device 22 from the mold 10. The cooling plate is sealed such that there is no danger of directly exposing the glass being formed in the mold to the circulating fluid. Relatively cool fluid can be supplied to the cooling plate through the supply tubes 28, 30, and relatively warm fluid, which has absorbed heat from the mold 10, can be removed from the cooling plate through the discharge tube 32. The temperature of the cooling plate, and ultimately the temperature of the desired region(s) of the mold, can be adjusted by increasing or decreasing the flow rate of the fluid circulated through the cooling plate. Any suitable flow control devices such as valves and pumps may be used to control the flow rate of the fluid circulated through the cooling plate. The flow control device(s) may be operated using real-time measurement of mold temperature or historical data. A suitable example of a cooling plate is disclosed in US Patent Publication No. 2013/00981110 ("Bailey"), although other types of cooling plates may also be used.

It should be noted that the Bailey publication mentioned above describes placing the cooling plate in close proximity, but not in physical contact, with the mold. This would suggest that there is a gap between the cooling plate and mold. However, the Bailey publication teaches that the dominant mode of heat transfer between the cooling plate and mold is by radiation, which would mean a gap height that is too large for the dominant mode of heat transfer between the cooling plate and mold to be by conduction.

Figure 3:
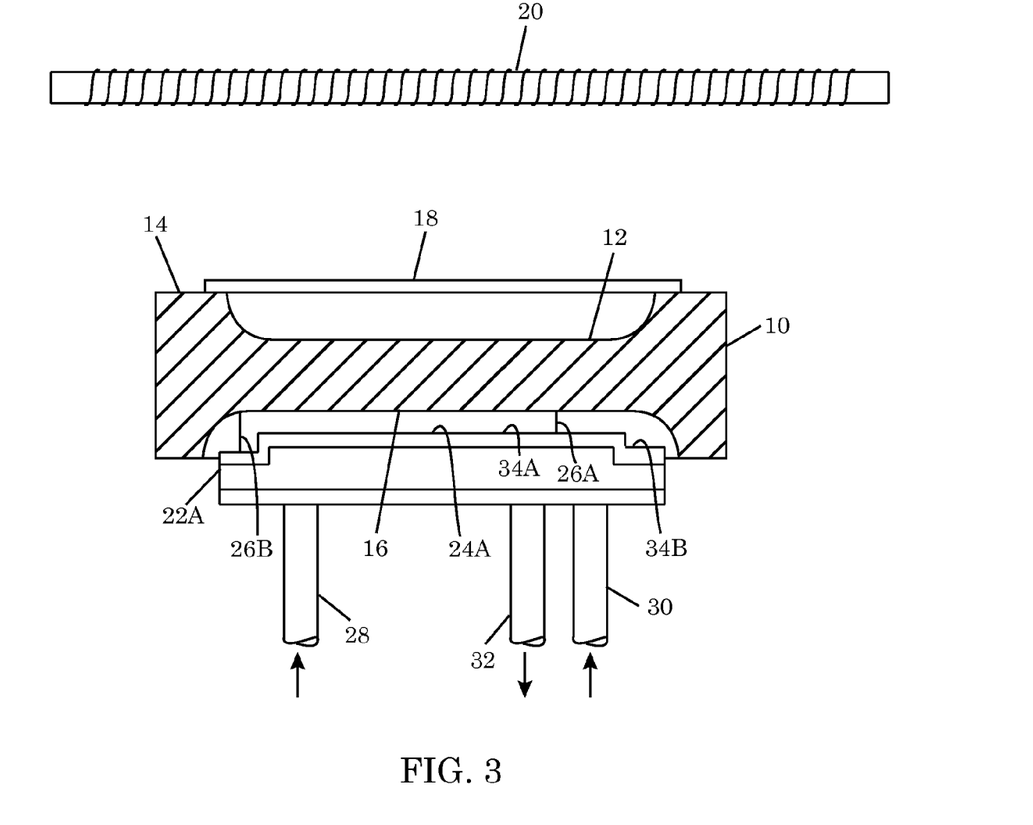
FIG. 3 shows a heat exchanger with differentiated heat transfer regions.

For differential cooling of the mold 10, the upper surface of the heat transfer device may be designed to have differentiated regions in terms of gap height. For example, as shown in FIG. 3, the upper surface 24A of the heat transfer device 22A may have a surface portion 34A where a first gap height can be established relative to the back surface 16 of the mold 10 and a surface portion 34B where a second gap height can be established relative to the back surface 16 of the mold 10, where the first and second gap heights are not the same. Both the first and second gap heights can be small, e.g., in a range from 0.1 mm to 0.8 mm. Alternatively, one of the gap heights can be small, e.g., in a range from 0.1 mm to 0.8 mm, while the other gap height is large, e.g., 1 mm or greater. The larger gap height may be located where less heat removal is desired while the smaller gap height can be located where more heat removal is desired. Alternatively, multiple heat transfer devices with uniform-height upper surfaces may be used to achieve the differentiated cooling of the mold.

Figure 4:
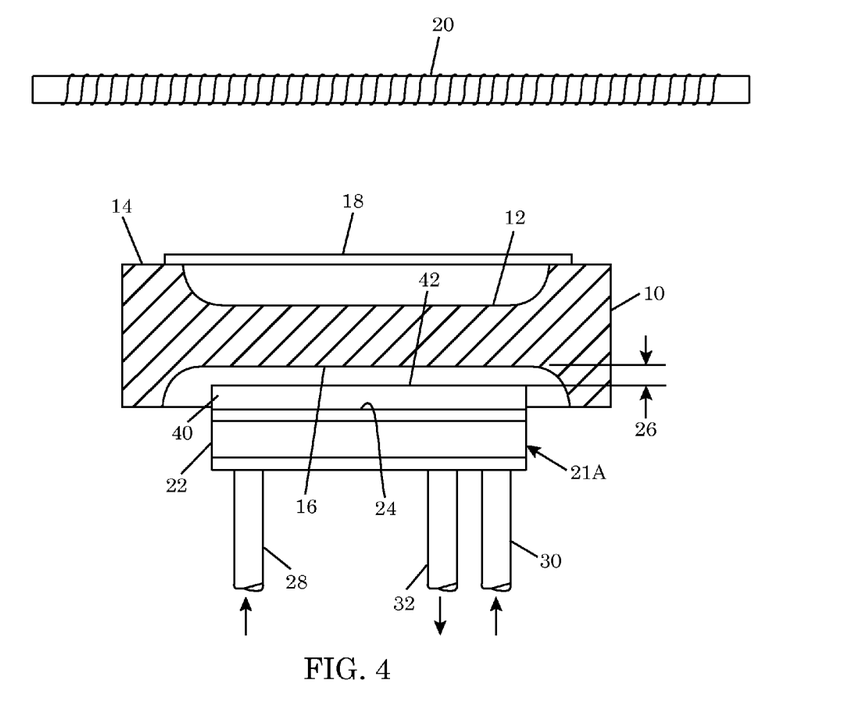
FIG. 4 shows a heat exchanger comprising primary and secondary heat transfer devices arranged to remove heat from at least a part of a mold during a glass sheet reforming process.

The heat exchanger used in cooling the mold may include a secondary heat transfer device in addition to the heat transfer device 22. FIG. 4 shows an embodiment where a secondary heat transfer device 40 is arranged in contact with the heat transfer device 22, forming a heat exchanger 21A. The secondary heat transfer device 40 is between the upper surface 24 of the heat transfer device 22 and the back surface 16 of the mold 10 such that the gap 26 is now defined between the upper surface 42 (or heat exchange surface) of the secondary heat transfer device 40 and the back surface 16 of the mold 10. The secondary heat transfer device 40 may be provided in the form of a replaceable insert. This would allow tailoring of the gap 26 to the desired height for various glass forming cycles to be a simple matter of placing a secondary heat transfer device 40 having the appropriate height between the heat transfer device 22 and the back surface 16 of the mold 10. Multiple secondary heat transfer devices 40 with varying heights may be used to provide differentiated cooling regions as explained above with reference to FIG. 3.

In one embodiment, the secondary heat transfer device 40 is a plate made of a conductive material, typically a metal or alloy such as nickel and copper. The plate should be able to withstand high temperatures typical of the glass forming environment, e.g., temperatures greater than 500° C.

Figure 5:
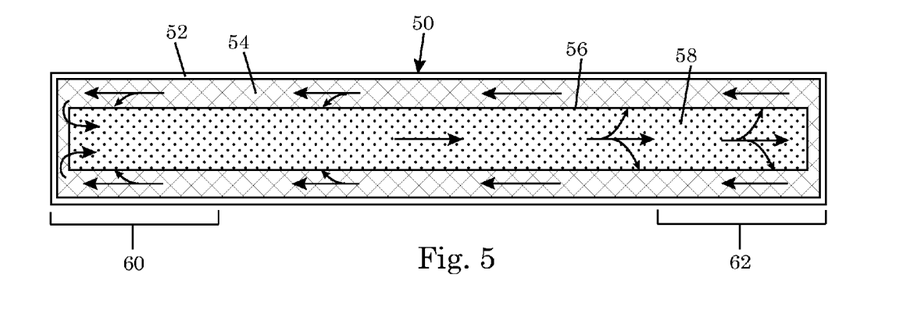
FIG. 5 shows a basic operation of a heat pipe.

In another embodiment, the secondary heat transfer device 40 is a heat pipe or other isothermal heat transfer device. A heat pipe is a device that uses condensation to transfer heat. FIG. 5 shows a basic diagram of a heat pipe 50 having a hermetically-sealed evacuated tube 52. The tube 52 may have a rectangular cross-section for a flat heat pipe that can be easily mated to the upper surface 24 (in FIG. 4) of the primary heat transfer device 22 (in FIG. 4), although other cross-sections are possible. The tube 52 is lined with a wick 54 and has a core 56 filled with a condensable working fluid 58. The wick 54 is a porous structure typically in the form of sintered metal powder, groove tube, or metal mesh. Examples of wick material include metal, such as steel, aluminum, copper, or titanium, and fibers, such as ceramic or carbon fibers. Appropriate wick material will be able to withstand the temperatures in the glass forming environment.

When one end, e.g., end 60, of the tube 52 is exposed to a temperature above the saturation temperature of the working fluid, the working fluid at that end turns into vapor, absorbing the latent heat of evaporation. The hot vapor flows to the colder end of the tube, e.g., end 62, where it condenses and gives out the latent heat. The condensed fluid then flows back through the capillary action of the wick 54 to the hot end 60 of the tube 52.

The working fluid is selected based on the operating temperatures in the glass forming environment. Examples of heat pipe working fluids are liquid nitrogen (−200° C. to −80° C.), liquid ammonia (−70° C. to +60° C.), methanol (−45° C. to +120° C.), water (+5° C. to +230° C.), mercury (+190° C. to +550° C.), potassium (+400° C. to +800° C.), sodium (+500° C. to +900° C.), lithium (+900° C. to +1,500° C.), and silver (+1,500° C. to +2,000° C.)—the numbers indicated in parentheses are the operating temperature ranges of the heat pipe working fluids. For example, if the operating temperatures in the glass forming environment are in a range from 550° C. to 900° C., sodium or potassium would be a suitable working fluid.

For the heat exchanger including a combination of the heat pipe 50 and heat transfer device 22, the heat transfer device 22 will essentially act as a heat sink for the heat pipe. However, the amount of heat removed from the mold can still be controlled by the heat transfer device 22. For example, where the heat transfer device 22 is a cooling plate, the rate at which fluid is circulated through the cooling plate can be used to control the amount of heat removed from the mold.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of making glass articles, comprising:
   placing a glass sheet on top of a mold;
   arranging a heat exchanger relative to the mold such that a heat exchange surface of the heat exchanger is in opposing relation to a back surface of the mold and separated from the back surface of the mold by a gap containing a layer of gas, the gap defining a thickness of the layer of gas;
   selecting the height of the gap to be less than 3 mm but greater than zero, the selected height being such that free convective heat transfer through the layer of gas is precluded, heat transfer through the layer of gas is by a combination of radiation and conduction, with conduction being the dominant heat transfer mechanism, and heat removal from the mold at a cooling rate of 7 W/cm$^2$ or greater is enabled;
   heating the glass sheet to a forming temperature;
   forming a shaped glass article from the glass sheet with the mold;
   at a select time during the forming of the shaped glass article, operating the heat exchanger to remove heat from at least a portion of the mold at a cooling rate of 7 W/cm$^2$ or greater; and
   cooling the shaped glass article to a temperature below the forming temperature.

2. The method of claim 1, wherein the height of the gap is less than 1.0 mm.

3. The method of claim 1, wherein the height of the gap is in a range from 0.1 mm to 0.8 mm.

4. The method of claim 1, wherein the height of the gap is in a range from 0.1 mm to 0.6 mm.

5. The method of claim 1, wherein the heat exchanger comprises a cooling plate having internal passages for circulation of fluid, and wherein operating the heat exchanger comprises circulating fluid through the internal passages of the cooling plate.

6. The method of claim 1, wherein the heat exchanger comprises a primary heat transfer device arranged in opposing relation to the back surface of the mold and a secondary heat transfer device arranged in contact with the primary heat transfer device and between the primary heat transfer device and the back surface of the mold, and wherein operating the heat exchanger comprises at least actively operating the primary heat exchanger.

7. The method of claim 6, wherein the primary heat transfer device is a cooling plate having internal passages for circulation of fluid, and wherein operating the heat exchanger comprises circulating fluid through the internal passages of the cooling plate.

8. The method of claim 7, wherein the secondary heat transfer device comprises a conductive plate made of a metal or alloy, and wherein operating the heat exchanger comprises removing heat from the secondary heat transfer device to the primary heat transfer device.

9. The method of claim 7, wherein the secondary heat transfer device comprises a heat pipe configured to remove heat in a range of temperatures at which the glass sheet is formed.

10. The method of claim 1, wherein the forming temperature is between a temperature corresponding to a glass viscosity of $10^{11}$ poise and a temperature corresponding to a glass viscosity of $10^7$ poise, and wherein forming comprises conforming the glass sheet to a shaping surface of the mold by vacuum.

11. The method of claim 1, wherein operating the heat exchanger comprises avoiding heat transfer by forced convection through the layer of gas.

12. The method of claim 1, wherein the layer of gas comprises a gas or mixture of gases selected from air and inert gases.

* * * * *